(12) United States Patent
Hammerslag et al.

(10) Patent No.: US 7,207,488 B2
(45) Date of Patent: Apr. 24, 2007

(54) COMBINED BARCODE SCANNER AND RADIO FREQUENCY IDENTIFICATION READER WITH FIELD INTERPRETATION ARRAY

(75) Inventors: Ed Hammerslag, Thousand Oaks, CA (US); Charles E. Wilson, Simi Valley, CA (US)

(73) Assignee: Precision Dynamics Corproation, San Fernando, CA (US)

( * ) Notice: Subject to any disclaimer, the term of this patent is extended or adjusted under 35 U.S.C. 154(b) by 0 days.

(21) Appl. No.: 11/163,920

(22) Filed: Nov. 3, 2005

(65) Prior Publication Data

US 2006/0138232 A1 Jun. 29, 2006

Related U.S. Application Data

(60) Provisional application No. 60/625,689, filed on Nov. 4, 2004.

(51) Int. Cl.
*G06K 7/00* (2006.01)
(52) U.S. Cl. .................... 235/440; 235/462.13
(58) Field of Classification Search ............... 235/440, 235/462.13
See application file for complete search history.

(56) References Cited

U.S. PATENT DOCUMENTS

| | | | |
|---|---|---|---|
| 5,059,951 A | 10/1991 | Kaltner | |
| 5,103,235 A | 4/1992 | Clemens | |
| 5,241,160 A | 8/1993 | Bashan et al. | |
| 5,270,525 A | 12/1993 | Ukai et al. | |
| 5,373,301 A * | 12/1994 | Bowers et al. | 343/742 |
| 5,382,784 A * | 1/1995 | Eberhardt | 235/462.46 |
| 5,541,399 A | 7/1996 | de Vall | |
| 5,563,402 A | 10/1996 | Reddersen et al. | |
| 5,756,981 A * | 5/1998 | Roustaei et al. | 235/462.42 |
| 5,763,867 A | 6/1998 | Main et al. | |
| 5,811,782 A | 9/1998 | Sato et al. | |
| 5,907,146 A | 5/1999 | Bridgelall et al. | |
| 5,917,412 A | 6/1999 | Martin | |
| 5,990,794 A | 11/1999 | Alicot et al. | |
| 6,024,289 A * | 2/2000 | Ackley | 235/494 |
| 6,154,135 A | 11/2000 | Kane et al. | |
| 6,169,483 B1 | 1/2001 | Ghaffari et al. | |
| 6,172,609 B1 * | 1/2001 | Lu et al. | 340/572.4 |
| 6,208,235 B1 | 3/2001 | Trontelj | |
| 6,237,852 B1 | 5/2001 | Svetal et al. | |
| 6,264,106 B1 | 7/2001 | Bridgelall | |
| 6,281,796 B1 | 8/2001 | Canipe et al. | |

(Continued)

*Primary Examiner*—Michael G. Lee
*Assistant Examiner*—Jamara A. Franklin
(74) *Attorney, Agent, or Firm*—Kelly Lowry & Kelley, LLP

(57) ABSTRACT

A combined barcode scanner and radio frequency identification reader includes a microprocessor control unit, an RFID module, a barcode scanner module, a host interface, and user interface(s). The microprocessor control unit utilizes a Field Interpretation Array to parse data into discrete fields that can be input into a host as if typed on a keyboard. The host interface permits the exchange of information between the apparatus and a host computer, and may take the form of an RS-232 connector, a USB connector, or a PS/2 keyboard connector. The user interface(s) may have one or more of a trigger, an LED light, and/or a beeper. When the trigger is in an undepressed state, the apparatus is in program mode. When the trigger is depressed the apparatus can enter one of multiple trigger modes. The trigger mode activates one or both of the RFID module and/or barcode scanner module.

26 Claims, 8 Drawing Sheets

U.S. PATENT DOCUMENTS

| | | | |
|---|---|---|---|
| 6,305,607 B1 * | 10/2001 | Katz et al. | 235/462.45 |
| 6,415,978 B1 * | 7/2002 | McAllister | 235/462.01 |
| 6,434,648 B1 * | 8/2002 | Assour et al. | 710/305 |
| 6,517,000 B1 | 2/2003 | McAllister et al. | |
| 6,627,860 B1 * | 9/2003 | Robertson | 219/506 |

* cited by examiner

COMBINED BARCODE SCANNER AND RADIO FREQUENCY IDENTIFICATION READER WITH FIELD INTERPRETATION ARRAY

BACKGROUND OF THE INVENTION

The present invention generally relates to devices for electronically reading an object. More particularly, the present invention relates to a combined barcode scanner and radio frequency identification (RFID) reader using novel field interpretation arrays.

It is well known in the field to place identification tags employing barcodes and/or RFID circuits on objects so that the objects can be more easily identified. For example, a barcode tag could be scanned by a light source and the varying intensity of the reflected light from the barcode produces a signal relating to the information encoded in the barcode. Similarly, an RFID tag can be read by a radio frequency (RF) signal and transmit a coded RF signal back to the reader corresponding to information about the object.

U.S. Pat. Nos. 6,264,106 and 5,382,784 disclose electronic circuits and devices for the combined scanning of barcodes and reading of RFID tags. U.S. Pat. No. 5,382,784 deals with the basic problem of combining a barcode scanner and an RFID reader in a single device and making an output signal from the RFID reader compatible with an output signal from the barcode scanner. U.S. Pat. No. 6,264,106 addresses the problem of adding an RFID reader to an existing barcode scanner. U.S. Pat. No. 6,264,106 employs two different processing circuits, one each for the barcode scanner and the RFID circuit.

When barcode and RFID readers scan their respective tags, they take in and pass on the data as a single line of information, e.g., "JohnSmith25JonesAvButteMT32150". This line translates as "name: John Smith street: 25 Jones Av City: Butte state: Mont. zip: 32150". Such data lines are becoming increasingly more detailed, particularly for RFID tags. There is a need for end users to have this data broken down into interpretation fields, both as a convenience to save time re inputting the data by hand or with key strokes into forms. More importantly, breaking this data down into interpretation fields will reduce error risk by eliminating the steps of manual entry required by the current state of the art.

Accordingly, it would be desirable to provide a device that includes both a barcode scanner and an RFID reader which scans data from available tags and then inputs it into the host computer as if it were typed on a keyboard.

SUMMARY OF THE INVENTION

The present invention resides in a combined barcode scanner and radio frequency identification (RFID) reader apparatus comprising a microprocessor control unit, an RFID module electronically connected to the microprocessor control unit, a barcode module electronically connected to the microprocessor control unit, and a host interface electronically connected to the microprocessor control unit. The microprocessor control unit utilizes a Field Interpretation Array (FIA) to parse data into discrete data fields. The FIA comprises field number, field address, field length, field header, and field trailer identifiers. The RFID module comprises an antenna, a radio frequency (RF) amplifier, and a reader module. The barcode module comprises a camera module and an image module.

The host interface permits the exchange of information between the apparatus and a host computer. The host interface can comprise an RS-232 interface, a USB interface, a PS/2 interface, or any other known mode of connecting an electronic device to a computer.

A user interface is electrically connected to the microprocessor control unit and may comprise a trigger, an LED light, and/or audible alarm, i.e., a beeper. The trigger may comprise a multi-position device wherein each position indicates at least one of the following functions: place the apparatus in program mode; operate the barcode module; operate the RFID module; and operate alternately both the barcode module and the RFID module. The LED light may consist of a single bi-color LED light or multiple bi-color LED lights.

The RS-232 interface consists of a transceiver that converts standard RS-232 voltage level signals received from a serial port on the host computer into TTL voltage signals for transmission to a TTL serial interface on the microprocessor control unit. The USB interface communicates with the host computer through a USB port emulating a serial interface, as well as, a keyboard interface. The USB interface converts data from a TTL voltage signal from the microprocessor control unit into a USB compatible voltage signal for transmission to the host computer. The PS/2 interface is a keyboard switch comprising a hex buffer and an analog switch.

In the RFID module, the reader module selects, reads and writes RFID tags by means of signals through the antenna. The RF amplifier comprises a power supply, a transmitter and a receiver. The receiver comprises first and second signal matching circuits, a signal amplifier, and a passive filter. The receiver comprises an envelope detector, a passive filter, an active filter, and a comparator circuit.

While one of the most obvious advantages of the present invention lies in its enhanced form-filling capabilities, thereby eliminating errors of manual transcription and reducing time for same, other features and advantages of the present invention will become apparent from the following more detailed description, taken in conjunction with the accompanying drawings which, by way of example, illustrate the principles of the invention.

BRIEF DESCRIPTION OF THE DRAWINGS

The accompanying drawings illustrate the invention. In such drawings.

DETAILED DESCRIPTION OF THE PREFERRED EMBODIMENTS

Figure 1:
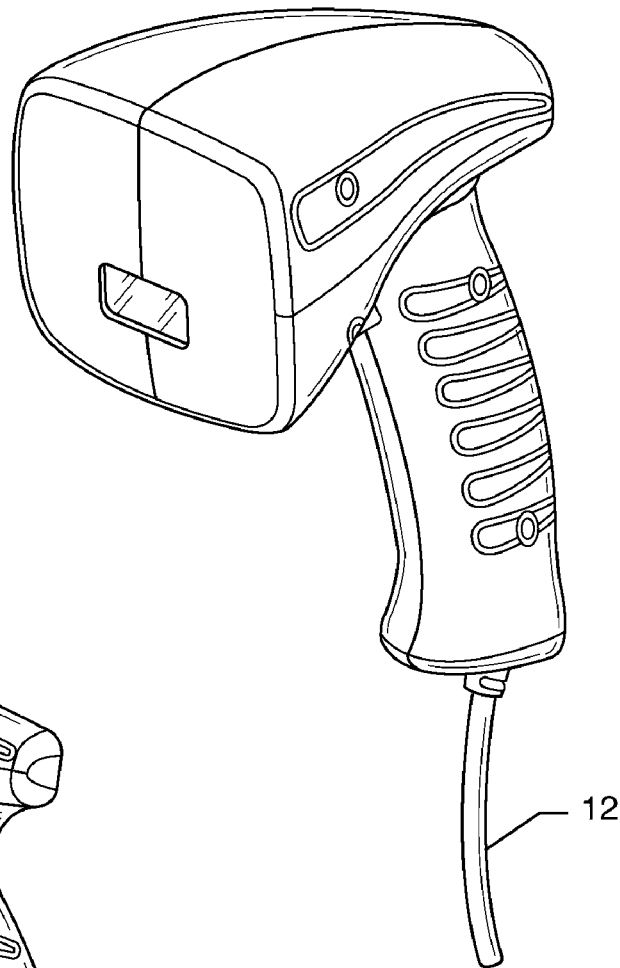
FIG. 1 is a perspective view of a hand held device incorporating the combined barcode scanner and RFID reader apparatus of the present invention.
Figure 2:
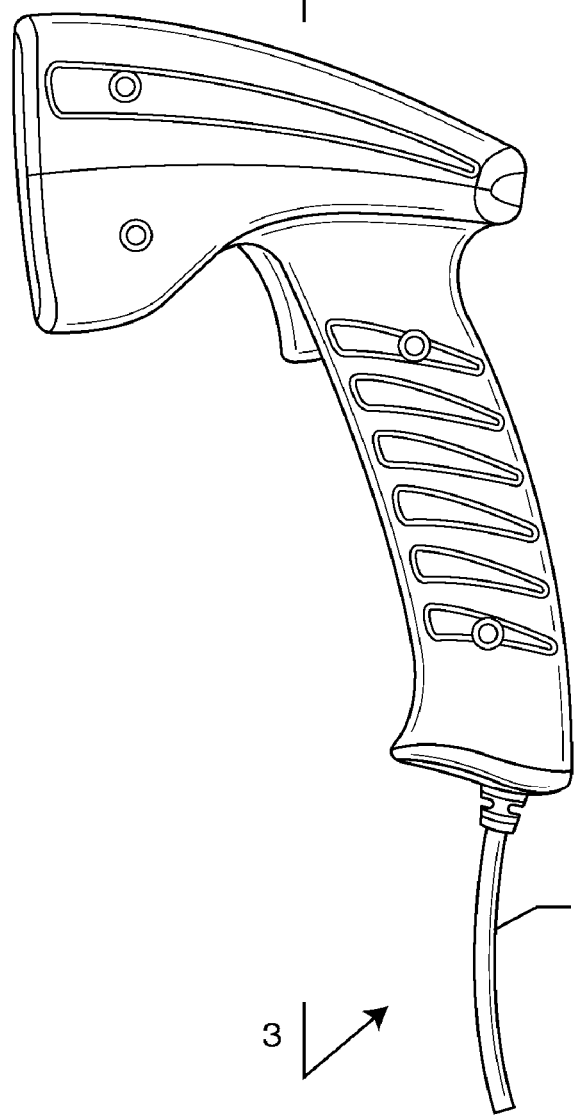
FIG. 2 is a side view of the device shown in FIG. 1.
Figure 3:
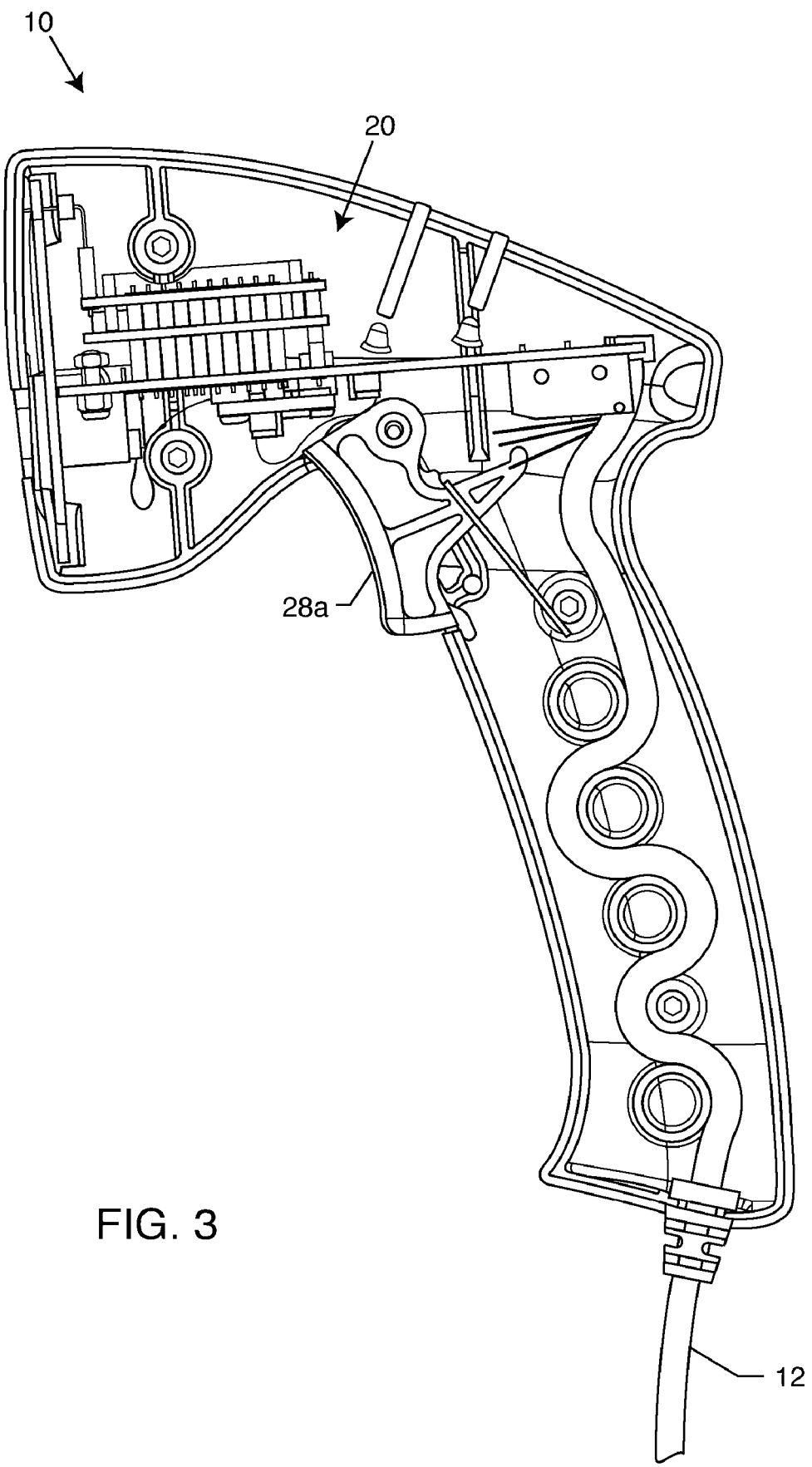
FIG. 3 is a cross-section view taken along line 3—3 of FIG. 2.

As shown in the drawings for purposes of illustration, the present invention relates to a combined barcode scanner and radio frequency identification (RFID) reader device. A form of the device 10 is illustrated in FIGS. 1–3 which depict a hand held device having a cord 12 extending therefrom for connection to a host computer. As will be described below, the end of the cord 12 possesses one of several connection interfaces.

Figure 4:
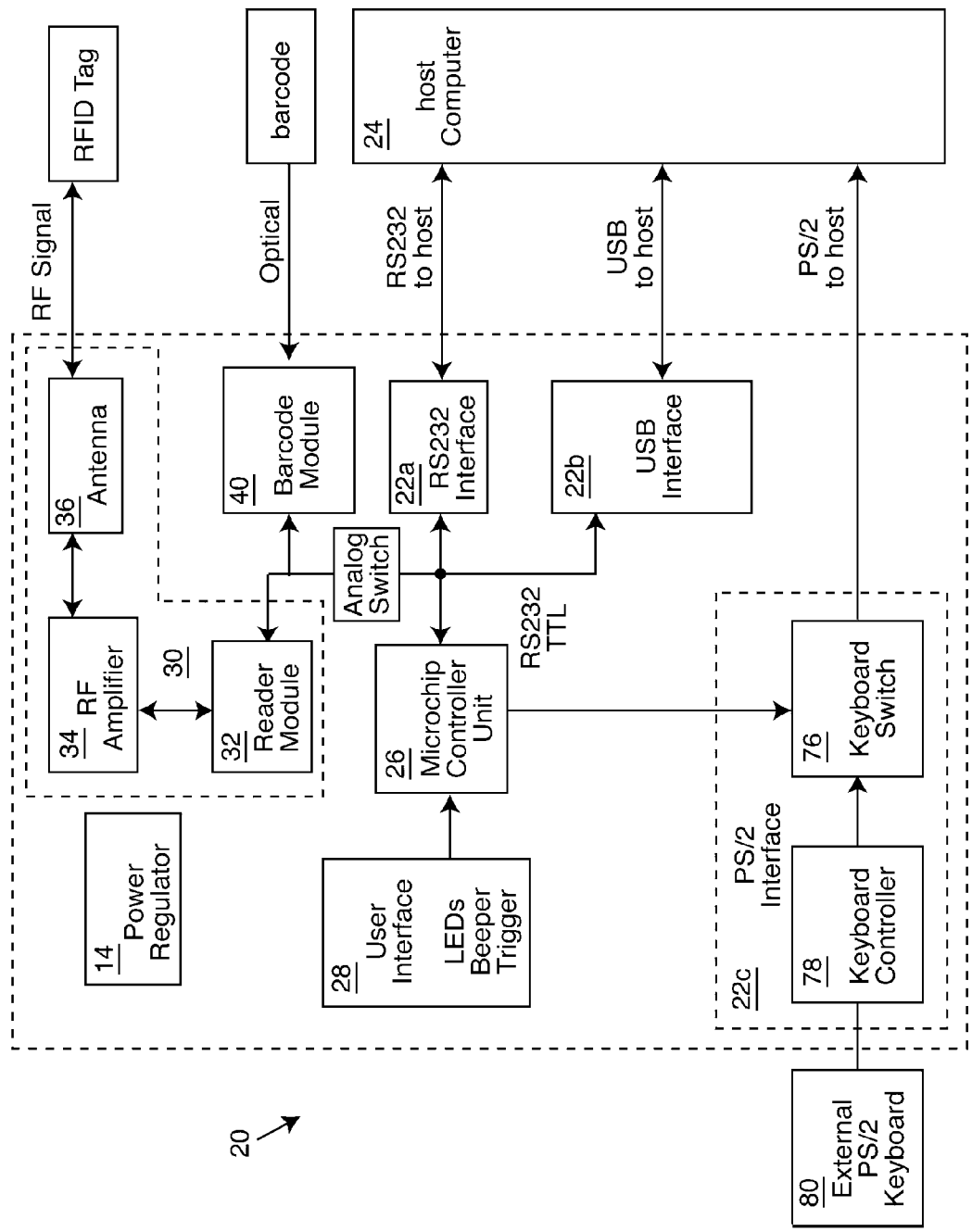
FIG. 4 is a block diagram illustrating an alternate embodiment of the apparatus of the present invention.

As shown in FIG. 4, the combined barcode scanner and RFID reader apparatus 20 contained within the device 10 is fully modular with upgradeable hardware and firmware components. The apparatus 20 includes a fully integrated RFID module 30 and a fully integrated barcode scanner module 40. The apparatus 20 includes three host interface 22 connectors for communication with a host computer 24. The host interface 22 connectors include an RS-232 connector 22a; a USB connector 22b; and a PS/2 keyboard connector 22c.

The microprocessor control unit 26 does not process the data; it merely forwards the data to the host computer 24 via the appropriate host interface 22. The microprocessor control unit 26 receives configuration data from the host computer in the form of a Field Interpretation Array (FIA) consisting of a template for outputting scanned data. The FIA accomplishes dual purposes: (1) how to store the data in the array; and (2) how to output the data stored in the array.

Field number is the field identifier. The microprocessor control unit 26 will output scanned data starting at field 0. The scanned data will be matched up with each field sequentially until all interpretation fields have been matched up.

Field address corresponds to an address in the scanned data buffer of the microprocessor control unit 26. For each field number, the field address is the starting location in the buffer of the microprocessor control unit 26 that will be sent to the host computer 24.

Field length corresponds to the length of the data in number of bytes to be output starting at the field address. Data in the scanned data buffer of the microprocessor control unit 26 will be output sequentially from the field address to the field address plus field length.

Field header corresponds to a string of data sent at the beginning of each field number output. The header field indicates the beginning of the current interpretation array field. Each field number may have a unique header.

Field trailer corresponds to a string of data sent at the end of each field number output. This field indicates the termination of the current interpretation array field. Each field number may have a unique trailer.

The FIA represents how information that is read from a barcode and/or an RFID tag is parsed by the microprocessor control unit 26 and is "wedged" into other data formats. A "wedge" sends data to an existing program that accepts the data without having to change the other program—an enhanced form filling. For example, the data field discussed above "JohnSmith25JonesAvButteMT32150+121501" may be broken up and sent to a host computer 24 and "interpreted" data fields may be automatically inserted into form fields of a pre-existing program, i.e., a mail merge.

In the preferred embodiment, the invention is implemented through a combination of firmware and software installed in the apparatus 20. Implementation could be either 100% firmware or 100% software, but the inventors have found a combination of firmware and software is most effective. As an example of implementation, the inventive FIA allows for the addition of line fields—name, street, city, state, zip—within a line of data as it is scanned in. The data corresponding to these line fields, "wedges," are then output as described above.

FIA parameters are loaded into the microprocessor control unit 26 by the host computer 24. FIA parameter data is sent to the microprocessor control unit 26 in sequential order via either RS-232 connector 22a or the USB connector 22b host interfaces.

All FIA data will be output in the following format where H stands for header, T stands for trailer and $F_{XL}$ is the data of size length L in field X.

$$TNF_{NL}HN \quad \ldots \quad T3F_{3L}H3 \quad T2F_{2L}H2 \quad T1F_{1L}H1$$

Field N ---------------------------------------------> Field 1

The following example uses the interpretation fields 0–4 and the RFID data buffer defined below:

| Field Data: | Address | Length | Header | Trailer |
|---|---|---|---|---|
| Field 0: | 0x0002 | 0x0008 | <NONE> | 0x44556677 |
| Field 1: | 0x00DC | 0x0003 | <NONE> | 0x1122DDEE |
| Field 2: | 0x0064 | 0x0022 | 0xFFFFFFFF | <NONE> |
| Field 3: | 0x0000 | 0x0001 | 0xAB01CD02 | 0XDC |
| Field 4: | 0x00A6 | 0x0004 | <NONE> | 0XFEDA5622 |

Bytes 0–9: 0x01 0x01 0x01 0x01 0x01 0x01 0x01 0x01 0x01 0x01
Bytes 10–19: 0x02 0x02 0x02 0x02 0x02 0x02 0x02 0x02 0x02 0x02
Bytes 20–29: 0x03 0x03 0x03 0x03 0x03 0x03 0x03 0x03 0x03 0x03
Bytes 30–39: 0x04 0x04 0x04 0x04 0x04 0x04 0x04 0x04 0x04 0x04
Bytes 40–49: 0x05 0x05 0x05 0x05 0x05 0x05 0x05 0x05 0x05 0x05
Bytes 50–59: 0x06 0x06 0x06 0x06 0x06 0x06 0x06 0x06 0x06 0x06
Bytes 60–69: 0x07 0x07 0x07 0x07 0x07 0x07 0x07 0x07 0x07 0x07
Bytes 70–79: 0x08 0x08 0x08 0x08 0x08 0x08 0x08 0x08 0x08 0x08
Bytes 80–89: 0x09 0x09 0x09 0x09 0x09 0x09 0x09 0x09 0x09 0x09
Bytes 90–99: 0x10 0x10 0x10 0x10 0x10 0x10 0x10 0x10 0x10 0x10
Bytes 100–109: 0x11 0x11 0x11 0x11 0x11 0x11 0x11 0x11 0x11 0x11
Bytes 110–119: 0x12 0x12 0x12 0x12 0x12 0x12 0x12 0x12 0x12 0x12
Bytes 120–129: 0x13 0x13 0x13 0x13 0x13 0x13 0x13 0x13 0x13 0x13
Bytes 130–139: 0x14 0x14 0x14 0x14 0x14 0x14 0x14 0x14 0x14 0x14
Bytes 140–149: 0x15 0x15 0x15 0x15 0x15 0x15 0x15 0x15 0x15 0x15
Bytes 150–159: 0x16 0x16 0x16 0x16 0x16 0x16 0x16 0x16 0x16 0x16
Bytes 160–169: 0x17 0x17 0x17 0x17 0x17 0x17 0x17 0x17 0x17 0x17
Bytes 170–179: 0x18 0x18 0x18 0x18 0x18 0x18 0x18 0x18 0x18 0x18
Bytes 180–189: 0x19 0x19 0x19 0x19 0x19 0x19 0x19 0x19 0x19 0x19
Bytes 190–199: 0x20 0x20 0x20 0x20 0x20 0x20 0x20 0x20 0x20 0x20
Bytes 200–209: 0x21 0x21 0x21 0x21 0x21 0x21 0x21 0x21 0x21 0x21
Bytes 210–219: 0x22 0x22 0x22 0x22 0x22 0x22 0x22 0x22 0x22 0x22
Bytes 220–229: 0x23 0x23 0x23 0x23 0x23 0x23 0x23 0x23 0x23 0x23
Bytes 230–239: 0x24 0x24 0x24 0x24 0x24 0x24 0x24 0x24 0x24 0x24
Bytes 240–249: 0x25 0x25 0x25 0x25 0x25 0x25 0x25 0x25 0x25 0x25
Bytes 250–255: 0x26 0x26 0x26 0x26 0x26 0x26

Output data from microprocessor control unit 26 using FIA defined above:

```
Field 0: 0101010101010101 44556677
Field 1: 232323 1122DDEE
Field 2:
FFFFFFFF
1111111111111111111112121212121212121212131313131313131313131414
Field 3: AB01CD02 01 DC
Field 4: 17171717 FEDA5622
```

Regarding FIAs and the above example, the field address is an index to the data buffer of the microprocessor control unit 26.

The field address does not have to be sequential. That is, the fields in the FIA can jump to different addresses in the data buffer. The first field can output data at the end of the buffer and the next field can output data at the beginning of the buffer. Data will be matched up with the FIA until the last interpretation array has been interpreted. A direct consequence of this is the data will always be output in order starting with field 0. The microprocessor control unit 26 does not separate or delimit fields except through the header and trailer. That is, the header, data and trailer will be sent for field 0 then field 1 then field 2. The example describes how data is sent to the host computer 24 in field interpretation mode.

As shown in the block diagram of FIG. 4, the apparatus 20 consists of a microprocessor control unit 26 interfacing with the RFID module 30 and the barcode scanner module 40. The host interface 22 connectors permit the exchange of information between the RFID module 30 and/or barcode scanner module 40, on the one hand, and the host computer 24, on the other hand. Various user interfaces 28 allow the microprocessor control unit 26 to inform a user as to the operation of the apparatus 20 or allow a user to change operating mode of the apparatus 20. The user interfaces 28 include a trigger 28*a*, an LED light 28*b*, or an audible alarm or beeper 28*c*. The states of each user interface 28 are controlled and monitored by the microprocessor control unit 26. The apparatus further includes a power supply circuit 14 rated for the requirements of the integrated circuit modules 30, 40 used in the apparatus 20.

In the preferred embodiment, the apparatus 20 has two multi-color LED lights 28*b*. The first LED light 28*b* indicates that the apparatus 20 is performing a scanning function, i.e., scanning a barcode or reading an RFID tag. The second LED light 28*b* indicates whether a scanning or reading function was successful. The colors of the multi-color LED lights 28*b* may be red, green or yellow. Also in the preferred embodiment, the beeper 28*c* is programmed to provide user feedback for any operation performed by the apparatus 20. Most often, the beeper 28*c* is used to indicate a successful read operation.

The apparatus 20 itself has two operating modes: a trigger mode and a program mode. The operating mode may be determined by both the form of the host interface 22 and/or a signal received from a user interface 28. The apparatus 20 has three main configurations corresponding to the various forms of the host interface 22. These three configurations are the RS-232 interface 22*a*, the PS/2 keyboard interface 22*c*, and the USB interface 22*b*. The USB interface 22*b* can emulate either an RS-232 interface 22*a* or a PS/2 keyboard interface 22*c*. Each host interface 22 also consists of one or more of the following operational modes: RFID module 30 in trigger mode; barcode scanner module 40 in trigger mode; RFID module 30 in program mode; and barcode scanner module 40 in trigger mode.

Trigger mode, which corresponds to the user interface trigger 28*a* being depressed, will output data received by the RFID module 30 and/or the barcode scanner module 40 to the host computer 24 through the appropriate host interface 22. Program mode, which corresponds to the user interface trigger 28*a* being in an undepressed state, will accept commands from the host computer 24, send them to the RFID module 30 or the barcode scanner module 40, and then return responses to the host computer 24 through the appropriate host interface 22.

In the preferred embodiment, when a user depresses the trigger 28*a*, the apparatus 20 enters trigger mode and the apparatus 20 alternately searches for an RFID tag or a barcode. If either an RFID tag or barcode is detected by the appropriate module 30, 40, information will be read from the RFID tag or barcode by the appropriate module 30, 40. The microprocessor control unit 26 will automatically alternate between reading using the RFID module 30 and the barcode scanner module 40 as long as the trigger 28*a* is depressed, until one or both of the modules 30, 40 has a successful read of data. The microprocessor control unit 26 will then cause the apparatus 20 to output the data to the host computer 24 through the appropriate host interface 22. In alternate embodiments, still further positions of the trigger 28*a* may limit which module 30, 40 of the apparatus 20 is used to scan for an available information source, i.e., RFID tag or barcode.

In program mode, the host computer 24 uses various commands to control the RFID module 30, barcode scanner module 40 or microprocessor control unit 26. The microprocessor control unit 26 is the main controller for the combined barcode scanner and RFID reader apparatus 20. The microprocessor control unit 26 routes information to and from the RFID module 30 and the barcode scanner module 40, routes data information to and from the host computer 24, and controls command pathways for the apparatus 20.

The apparatus 20 is always in program mode until the trigger 28*a* is depressed. As long as the apparatus 20 has power, the apparatus 20 is always in program mode when not in trigger mode. In program mode, the apparatus 20 is always waiting for a command from the host computer 24. There are two types of commands from the host computer 24: tag commands and system commands. Tag commands are sent to the RFID module 30 by the microprocessor control unit 26. System commands are processed by the microprocessor control unit 26. In program mode, the apparatus 20 may write to an RFID tag.

The apparatus 20 will not respond to any commands sent from the host computer 24 while it is in trigger mode. If the trigger 28*a* is depressed while the apparatus 20 is executing a command in program mode, the command will execute before the apparatus 20 enters trigger mode.

The barcode scanner module 40 decodes barcode images into ASCII information and transmits the information on RS-232 TTL lines. The barcode scanner module 40 is capable of recording low resolution images in addition to barcode image decoding. The barcode scanner module can be programmed by the trigger 28a or a specific operation protocol executed during program mode. The barcode scanner module 40 can also be programmed via scanning certain barcode images. RS-232 control signals are used to regulate the communication stream from the barcode scanner module 40. The barcode scanner module 40 consists of a camera module 42 and an image module 44 mounted in the device 10.

Figure 6:
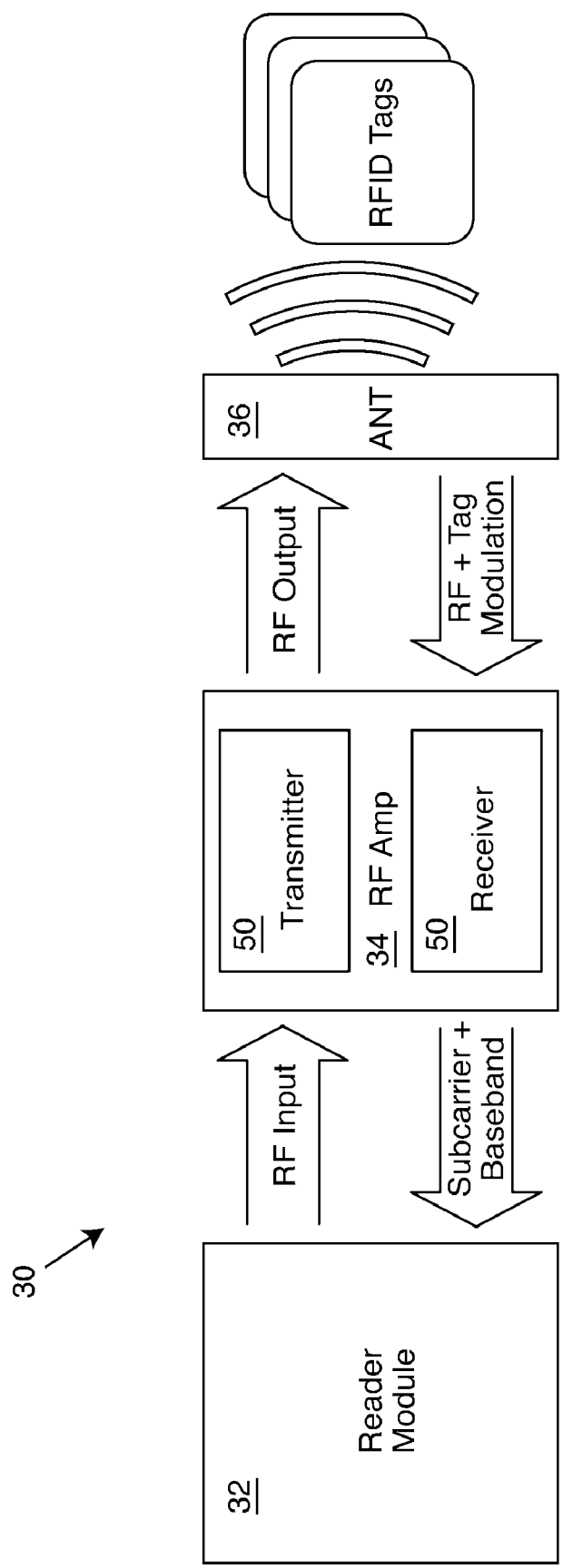
FIG. 6 is a block diagram illustrating an RFID module of the present invention.
Figure 7:
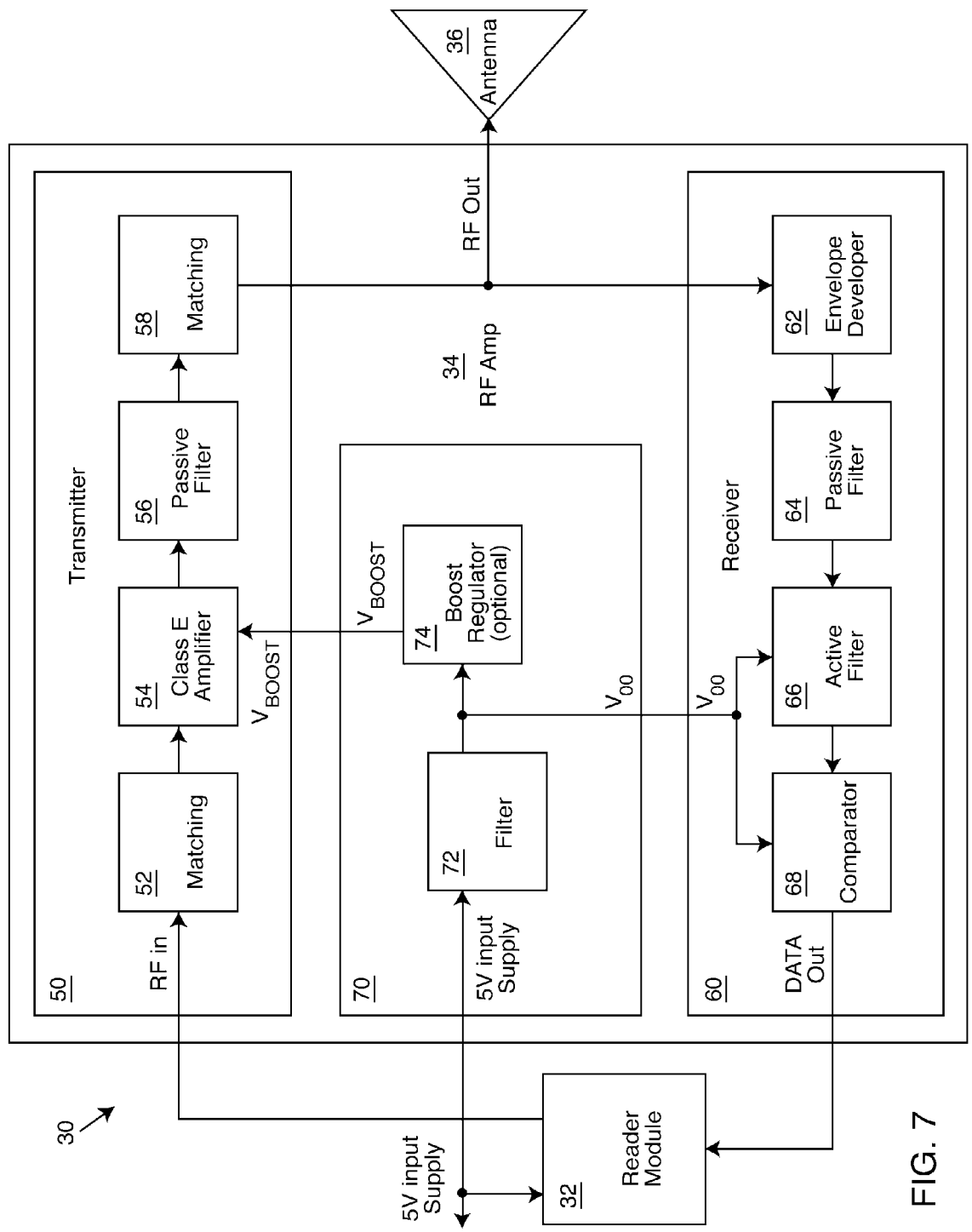
FIG. 7 is a block diagram illustrating the power supply transmitter and receiver of the RF amplifier, as well as, antenna and reader module of the RFID module.
Figure 8:
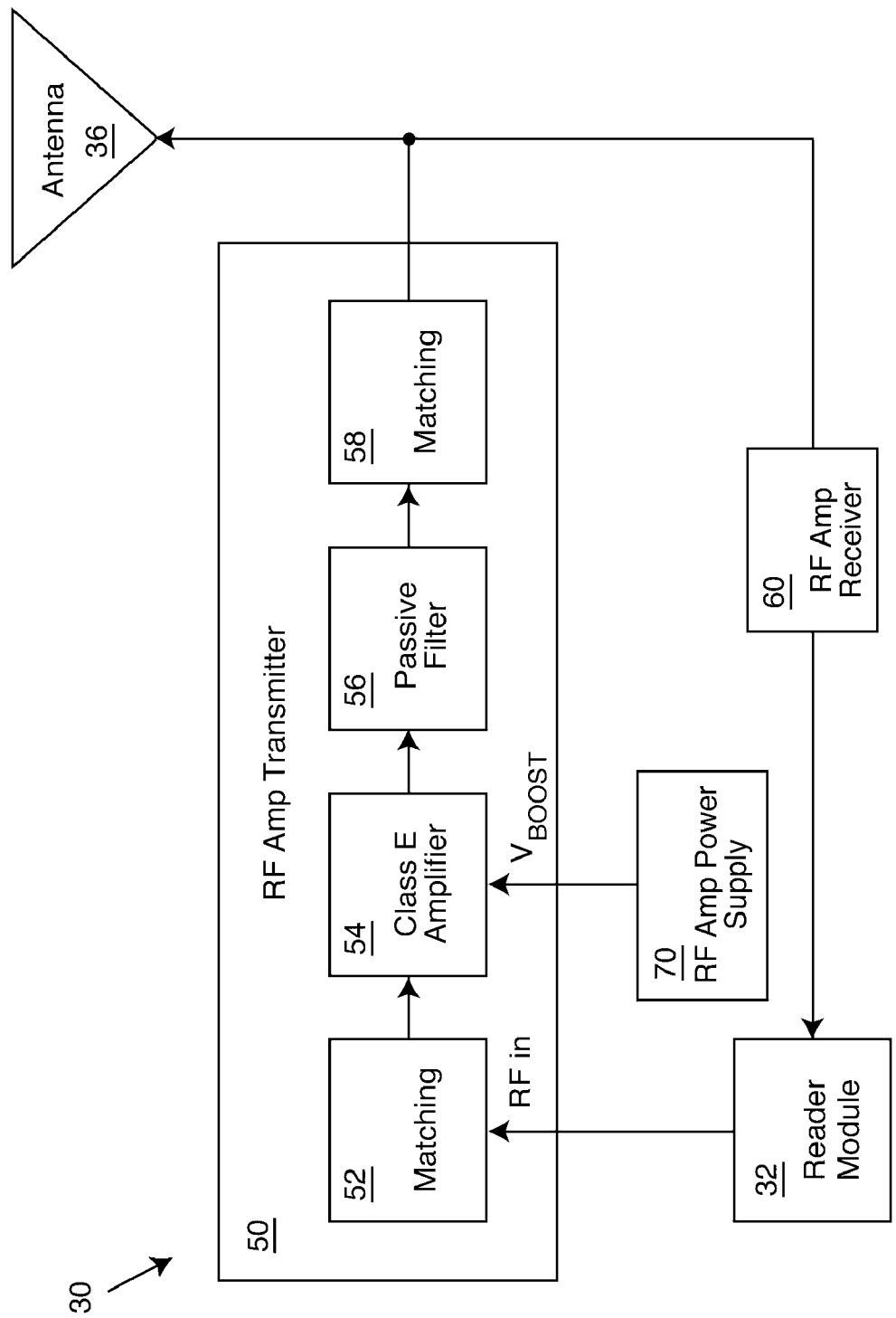
FIG. 8 is a block diagram illustrating the transmitter and power supply, as well as, the antenna and reader module of the RFID module.
Figure 9:
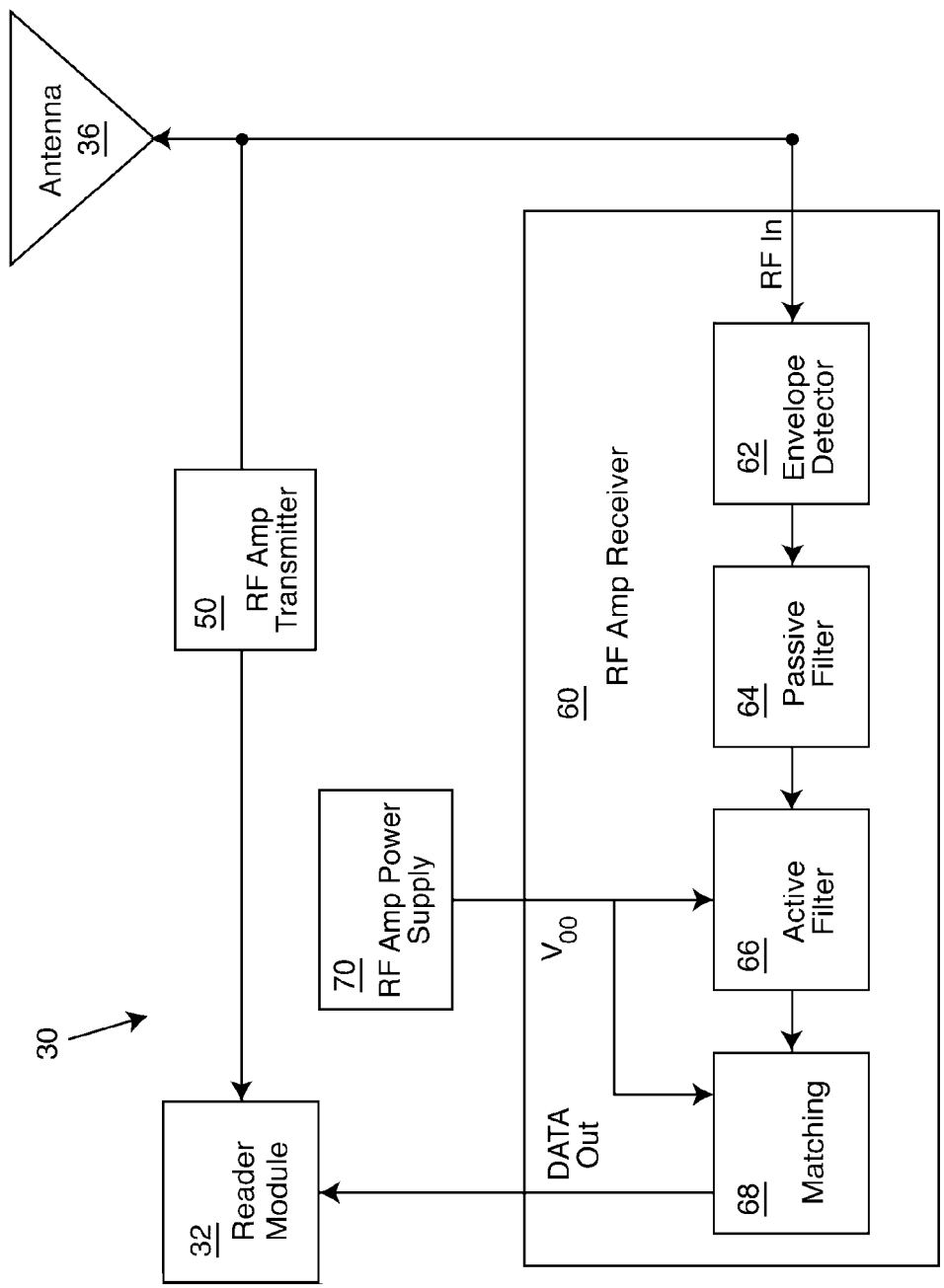
FIG. 9 is a block diagram illustrating the receiver and power supply, as well as, the antenna and reader module of the RFID module.

The RFID module 30 handles all communications with RFID tags. As shown in FIGS. 4, 6 and 7, the RFID module 30 consists of a reader module 32, a radio frequency amplifier 34 and an antenna 36. The radio frequency amplifier 34 consists of a transmitter 50, a receiver 60 and a power source 70. Referring to FIG. 8, the transmitter 50 comprises a first matching circuit 52, an amplifier 54, a passive filter 56 and a second matching circuit 58. Referring to FIG. 9, the receiver 60 consists of an envelope detector 62, a passive filter 64, an active filter 66, and a matching circuit 68. The power source 70 consists of a filter circuit 72 and optional boost regulator 74. The radio frequency amplifier 34 connects the reader module 32 to the antenna 36. The transmitter 50 of the radio frequency amplifier 34 receives input from the reader module 32 and transmits that output to the antenna 36 for generation of a radio frequency signal. The receiver 60 of the radio frequency amplifier 34 detects any incoming radio frequency signals picked up by the antenna 36. These incoming radio frequency signals are modulated in a way to communicate the information stored on the RFID tag which is read. The receiver 60 then communicates the received radio frequency signal to the reader module 32 for eventual routing to the host computer 24 by means of an appropriate host interface 22.

Figure 5:
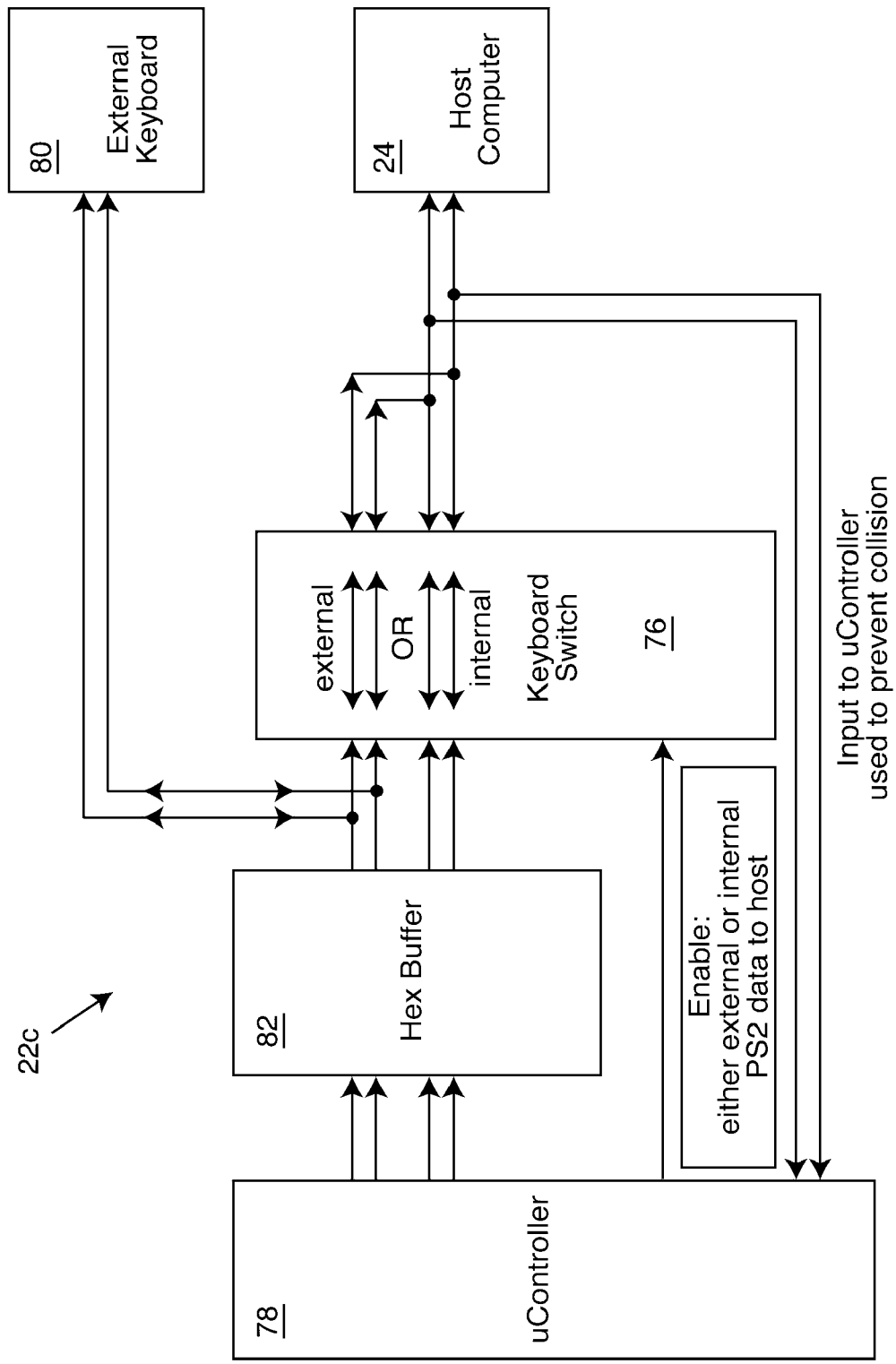
FIG. 5 is a block diagram illustrating a PS/2 host interface according to the present invention.

As previously described, the host interfaces 22 may take the form of an RS-232 connector 22A, a USB connector 22B, and a PS/2 connector 22C. As shown in FIG. 5, the PS/2 connector 22c includes a keyboard switch 76, a keyboard controller 78, a hex buffer 82, and may include an external PS/2 keyboard 86. The PS/2 interface 22c allows the microprocessor control unit 26 to communicate with the host computer 24. The RS-232 interface 22a includes a line controller that interfaces serial TTL voltage signals with standard RS-232 voltage levels. The USB interface 22b allows serial connections to be encoded into USB end points on the host computer 24. Busses used in the USB interface 22b are either an RS-232 serial bus or a PS/2 keyboard bus.

The host interfaces 22 are used both to communicate barcode and RFID tag data back to the host computer 24 in trigger mode and to communicate commands to the RFID module 30 and the barcode scanner module 40. A device operating in the RS-232 interface 22a configuration will be connected to a serial port of the host computer. The RS-232 interface 22a supports both program and trigger operating modes. In the RS-232 interface 22a configuration, the apparatus 20 can receive power either from an included power supply 14 or from the host interface 22.

In the PS/2 keyboard interface 22c configuration, the apparatus 20 will receive power only from the host interface 22. The apparatus 20 will be connected to a PS/2 port of the host computer 24. In this configuration, only trigger mode is supported and neither the RFID module 30 nor the barcode scanner module 40 will be able to receive data from the host computer 24. All data received from either the RFID module 30 or the barcode scanner module 40 will be output through the PS/2 interface 22c to the host computer 24 as keyboard data, i.e., keystrokes. The microprocessor control unit 26 converts data received from the RFID module 30 or the barcode scanner module 40 into keyboard data by mapping each byte value to an equivalent keystroke determined at the time firmware for the microprocessor control unit 26 is created.

In the USB interface 22b configuration, the apparatus 20 will emulate either a PS/2 keyboard interface 22c configuration or an RS-232 interface 22a configuration. Software states in the USB configuration will follow from the corresponding RS-232 interface 22a or PS/2 interface 22c configuration software states depending upon which interface is being emulated. For example, if the USB interface 22b is emulating an RS-232 interface 22a, the software states will be equivalent to the RS-232 interface 22a configuration. Likewise, if the USB interface 22b is emulating a PS/2 interface 22c, the software states will be equivalent to the PS/2 interface 22c configuration. Power in the USB interface 22b configuration will always be supplied from the USB connector.

When the USB interface 22b configuration emulates an RS-232 interface 22a, trigger mode and program mode are both supported. All data received by the microprocessor control unit 26 from the RFID module 30 or the barcode scanner module 40 will be routed to the USB interface 22b as RS-232 data on a serial port. When the USB interface 22b configuration emulates the PS/2 interface 22c, only trigger mode is supported. All data received by the microprocessor control unit 26 from the RFID module 30 or the barcode scanner module 40 will be routed to the USB port as keyboard data equivalent to the mapping for the PS/2 interface 22c configuration described above.

Although several different embodiments of the present invention have been illustrated and described in detail, various modifications may be made without departing from the spirit and scope of the invention. Accordingly, the invention is not to be limited except as by the appended claims.

What is claimed is:

1. A combined barcode scanner and radio frequency identification (RFID) reader apparatus, comprising:
   a microprocessor control unit, wherein the microprocessor control unit utilizes a field interpretation array to parse a continuous string of data into discrete data fields;
   an RFID module electrically connected to the microprocessor control unit, comprising an antenna, a radio frequency (RF) amplifier and a reader module;
   a barcode scanner module electrically connected to the microprocessor control unit, comprising a camera module and an image module; and
   a host interface electrically connected to the microprocessor control unit, permitting the exchange of information between the apparatus and a host computer.

2. The apparatus of claim 1, wherein the host interface comprises an RS-232 interface, a USB interface, or a PS/2 interface.

3. The apparatus of claim 2, wherein the RS-232 interface consists of a transceiver that converts standard RS-232 voltage level signals received from a serial port on the host computer into TTL voltage signals for transmission to a TTL serial interface on the microprocessor control unit.

4. The apparatus of claim 2, wherein the USB interface communicates with the host computer through a USB port emulating a serial interface, as well as, a keyboard interface.

5. The apparatus of claim 4, wherein the USB interface converts data from a TTL voltage signal from the microprocessor control unit into a USB compatible voltage signal for transmission to the host computer.

6. The apparatus of claim 2, wherein the PS/2 interface is a keyboard switch comprising a hex buffer and an analog switch.

7. The apparatus of claim 1, further comprising a user interface electrically connected to the microprocessor control unit wherein the user interface comprises a trigger, an LED light, or a beeper.

8. The apparatus of claim 7, wherein the trigger has multiple positions, each position instructing the microprocessor control unit to initiate at least one of the following functions: place the apparatus in program mode; operate the barcode scanner module; operate the RFID module; and operate alternately both the barcode scanner module and the RFID module.

9. The apparatus of claim 7, wherein the LED light comprises a bi-color LED light.

10. The apparatus of claim 9, wherein the LED light comprises two bi-color LED lights.

11. The apparatus of claim 1, wherein the reader module selects, reads and writes to RFID tags.

12. The apparatus of claim 1, wherein the RF amplifier comprises a power supply, a transmitter and a receiver.

13. The apparatus of claim 12, wherein the transmitter comprises first and second signal matching circuits, a signal amplifier, and a passive filter.

14. The apparatus of claim 12, wherein the receiver comprises an envelope detector, a passive filter, an active filter, and a comparator circuit.

15. The apparatus of claim 1, wherein the field interpretation array comprises data fields corresponding to field number, field address, field length, field header and field trailer.

16. A combined barcode scanner and radio frequency identification (RFID) reader apparatus, comprising:
  a microprocessor control unit, wherein the microprocessor control unit utilizes a field interpretation array to parse a continuous string of data into discrete data fields;
  an RFID module electrically connected to the microprocessor control unit, comprising an antenna, a radio frequency (RF) amplifier and a reader module, wherein the reader module selects, reads and writes RFID tags, wherein the RF amplifier comprises a power supply, a transmitter and a receiver;
  a barcode scanner module electrically connected to the microprocessor control unit, comprising a camera module and an image module;
  a host interface electrically connected to the microprocessor control unit, permitting the exchange of information between the apparatus and a host computer, wherein the host interface comprises an RS-232 interface, a USB interface, or a PS/2 interface; and
  a user interface electrically connected to the microprocessor control unit, wherein the user interface comprises a trigger, an LED light, or a beeper.

17. The apparatus of claim 16, wherein the trigger has multiple positions, each position instructing the microprocessor control unit to initiate at least one of the following functions: place the apparatus in program mode; operate the barcode scanner module; operate the RFID module; and operate alternately both the barcode scanner module and the RFID module.

18. The apparatus of claim 16, wherein the LED light comprises a bi-color LED light.

19. The apparatus of claim 18, wherein the LED light comprises two bi-color LED lights.

20. The apparatus of claim 16, wherein the RS-232 interface consists of a transceiver that converts standard RS-232 voltage level signals received from a serial port on the host computer into TTL voltage signals for transmission to a TTL serial interface on the microprocessor control unit.

21. The apparatus of claim 16, wherein the USB interface communicates with the host computer through a USB port emulating a serial interface, as well as, a keyboard interface.

22. The apparatus of claim 21, wherein the USB interface converts data from a TTL voltage signal from the microprocessor control unit into a USB compatible voltage signal for transmission to the host computer.

23. The apparatus of claim 16, wherein the PS/2 interface is a keyboard switch comprising a hex buffer and an analog switch.

24. The apparatus of claim 16, wherein the transmitter comprises first and second signal matching circuits, a signal amplifier, and a passive filter.

25. The apparatus of claim 16, wherein the receiver comprises an envelope detector, a passive filter, an active filter, and a comparator circuit.

26. The apparatus of claim 16, wherein the field interpretation array comprises data fields corresponding to field number, field address, field length, field header and field trailer.

* * * * *